United States Patent
Sathe et al.

(10) Patent No.: US 9,558,271 B1
(45) Date of Patent: Jan. 31, 2017

(54) ONTOLOGY DEVELOPMENT FOR PROFILE MATCHING

(75) Inventors: Sanjay Shrikrishna Sathe, Saratoga, CA (US); Daniel Bayne Davenport, Los Gatos, CA (US); Hitesh Shah, Saratoga, CA (US); Nachiket Dhananjay Kshirsagar, Maharashtra (IN)

(73) Assignee: RiseSmart, Inc., San Jose, CA (US)

( * ) Notice: Subject to any disclaimer, the term of this patent is extended or adjusted under 35 U.S.C. 154(b) by 0 days.

(21) Appl. No.: 13/282,387

(22) Filed: Oct. 26, 2011

Related U.S. Application Data

(60) Provisional application No. 61/406,967, filed on Oct. 26, 2010.

(51) Int. Cl.
  *G06F 7/00* (2006.01)
  *G06F 17/30* (2006.01)

(52) U.S. Cl.
  CPC .............................. *G06F 17/30734* (2013.01)

(58) Field of Classification Search
  CPC ................................................ G06F 17/30702
  USPC ....................................................... 707/777
  See application file for complete search history.

(56) References Cited

U.S. PATENT DOCUMENTS

| | | | |
|---|---|---|---|
| 7,555,441 B2 | 6/2009 | Crow et al. | |
| 7,599,930 B1 | 10/2009 | Burns et al. | |
| 7,720,971 B2 | 5/2010 | Moutafov | |
| 2005/0080657 A1* | 4/2005 | Crow | G06Q 10/10 705/7.14 |
| 2006/0265270 A1 | 11/2006 | Hyder et al. | |
| 2008/0059453 A1 | 3/2008 | Laderman | |
| 2008/0065633 A1* | 3/2008 | Luo | G06F 17/30867 |
| 2009/0132313 A1 | 5/2009 | Chandler et al. | |
| 2009/0187473 A1 | 7/2009 | Blaze et al. | |
| 2009/0276209 A1* | 11/2009 | Dane | G06F 17/271 704/9 |

* cited by examiner

*Primary Examiner* — Van Oberly
(74) *Attorney, Agent, or Firm* — Van Pelt, Yi & James LLP

(57) ABSTRACT

A method of matching job profiles with a candidate profile is disclosed. A plurality of concepts corresponding to an ontology is extracted from a candidate profile. A normalized candidate profile is generated, wherein the normalized candidate profile includes the plurality of concepts. A search query is formed at least in part based on the normalized candidate profile and the ontology. The search query is submitted to a source of job profiles. An initial batch of job profiles potentially matching the candidate profile is received from the source of job profiles. At least a subset of the plurality of concepts corresponding to the ontology is extracted from a job profile among the batch of job profiles. A normalized job profile is generated, wherein the normalized job profile includes the at least a subset of the plurality of concepts. Whether the normalized candidate profile matches with the normalized job profile is determined.

21 Claims, 14 Drawing Sheets

| CIO | | New York, NY | | Find Jobs |

What: Job Title, Keywords or Company   Where: City, State, or Zip

FIG. 2A

Chief IT Auditor - Office of the CIO for IT
The City of New York - New York, NY
The Office of the CIO for Information Technology is Seeking a Chief IT Auditor to Assess, Monitor, Manage and Remediate the Risks Associated with NYCHA Business...
From the City of New York - 10 Days Ago  Save Job - Block - Email - More...

*RiseSmart.* Transition Concierge you're logged in as xxxxxxxx  My Account | Logout | Package

| DASHBOARD | MY PROFILE | MY JOBS | MY COMPANIES | CAREER TOOLBOX |

MY PROFILE | JOB SEARCH PREFERENCES | YOUR NEW RESUME       📶 PROFILE STATUS

What: Let us know which jobs to look for

Add Job Titles In Order of Priority:

| Vice President Global Talent | ⊗ Your last title | Vice President Travel Service ⊗ |
| Vice President HR | ⊗ Add variations | Vice President Meetings & Ev ⊗ |
| SVP HR | ⊗ | Vice President Operations ⊗ |
| Vice President Administration ⊗ | | Vice President Supply Chain ⊗ |

YOUR PROFILE IS COMPLETE.

TO CHANGE YOUR JOB LEADS, EDIT YOUR PROFILE AND PRESS 'SAVE CHANGES'.

💡 TIPS N' TRICKS:

Add More Job Titles To Increase The Number Of Leads That We Send You

Add More Locations To Increase Your Options.

Choose up to 4 professional areas:
- ☐ Accounting
- ☐ Administration
- ☐ Banking
- ☐ Biotech Limit to Specific Industries:
- ☑ All Industries
- ☐ Accident & Health Insurance
- ☐ Advertising
- ☐ Advertising Agencies

How: What level and hours would you like?

Executive ▼
- ☑ Full-Time
- ☑ Contract
- ☐ Part-Time
- ☑ Telecommute
- ☐ Project-Basis

Where: Tell us where you'd like to work

Add Locations In Order of Priority: Zip Code Lookup

| 25 Miles ▼ | 75056 | ⊗ This is your home zip |
| 25 Miles ▼ | 67235 | ⊗ |
| 15 Miles ▼ | 78209 | ⊗ |

☐ I am open to relocating anywhere for work ( ✚ ADD MORE )                          ( SAVE CHANGES )

Activity Dashboard | My Profile | New Jobs | Career Toolbox | My Account | Contact Us |  🐦 Twitter  📘 Facebook  in Linkedin

```
Function - Regional Sales
    |-> Display Name - Regional Sales
    |-> Neutral Name - regional-sales
    |-> Synonyms - Regional Sales, Region Sales
    |-> Parent Function - Sales
    |-> Control Points (used for query generation and matching)
        |-> Consider Parent for Query - True
        |-> Consider Level for Query - True
        |-> Consider Industry for Query - True
        |-> Consider Skills for Query - False
        |-> Consider Max Years of experience - False
        |-> Consider Job Company Industry - True
```

```
Function -
    |-> Display Name - Product Management
    |-> Neutral Name - management-product
    |-> Synonyms - Product Management, Product Mgmt, prod management
    |-> Keywords - product, product management
    |-> Parent Function - NULL
    |-> Control Points (used for query generation and matching)
        |-> Consider Parent for Query - False
        |-> Consider Level for Query - True
        |-> Consider Industry for Query - True
        |-> Consider Skills for Query - False
        |-> Consider Max Years of experience - False
        |-> Consider Job Company Industry - False
```

Function -
    |-> Display Name - Product Strategy
    |-> Neutral Name - product-strategy
    |-> Synonyms - Product Strategy, Product Strategies
    |-> Keywords - Product Strategy, Product Strategies
    |-> Parent Function - NULL
    |-> Control Points (used for query generation and matching)
        |-> Consider Parent for Query - False
        |-> Consider Level for Query - True
        |-> Consider Industry for Query - True
        |-> Consider Skills for Query - False
        |-> Consider Max Years of experience - False
        |-> Consider Job Company Industry - False

Function -
    |-> Display Name - Marketing
    |-> Neutral Name - marketing
    |-> Synonyms - Marketing & Strategic Development, marketing
    |-> Keywords - marketing
    |-> Parent Function - NULL
    |-> Control Points (used for query generation and matching)
        |-> Consider Parent for Query - False
        |-> Consider Level for Query - True
        |-> Consider Industry for Query - True
        |-> Consider Skills for Query - False
        |-> Consider Max Years of experience - False
        |-> Consider Job Company Industry - False

FIG. 6D

NEUSTAR, Sterling, Virginia      2009 - Present
Senior Director Product Management
Selected to spearhead the <u>turnaround</u> of Enterprise products by strengthening the team, optimizing planning, prioritizing investments and strict capital management..

- Managed a portfolio including Internet naming and addressing (DNS, DHCP), and IP address management products (software, appliances, cloud solutions [SaaS, IaaS] and managed services).

NEXTEL COMMUNICATIONS, Reston, Virginia      2004 - 2005
Director of Product Strategy
Key member of product management and marketing; selected to develop and manage <u>emerging products</u> including VoIP, convergence, 4G and seamless mobility. Led the development and execution of ABC's growth strategy.

- Challenged to develop a strategy, Messaging, Digital Media, and Enterprise Solutions product lines, while addressing two key challenges: (1) ABC's per-customer data revenue (ARPU) was lowest among top five US companies and below 50% of market leader's, and (2) ABC's lack of broadband network.

EDUCATION

MS Management, School of Management, University of Texas at Dallas, Richardson, Texas
BS Computer Engineering, Indian Institute of Technology (IIT), Kanpur, India

FIG. 7A

Title

| VP Marketing | VP Product Strategy |
|---|---|
| VP Product Management | Senior Vice President Product Management |

Industry

| Telecommunications | Networking & Communication Devices | Internet Software & Services |
|---|---|---|
| Wireless | Information Technology Services | Enterprise Software |

Locations

| Sterling, VA | Reston, VA |
|---|---|

1. A list of <Function, Level, Industry> for each previous employment
(a) Senior Director Product Management, NEUSTAR
<Function: Product Management, Level: Senior Director, Industry: Information Technology and Services>
(b) Director of Product Strategy, NEXTEL COMMUNICATIONS
<Function: Product Strategy, Level: Director, Industry: Telecommunications>
2. A list of <Function, Level> extracted from the set of job preferences
(a) VP Marketing
<Function: Marketing, Level: VP >
(b) VP Product Strategy
<Function: Product Strategy, Level: VP >
(c) VP Product Management
<Function: Product Management, Level: VP >
(d) Senior Vice President Product Management
<Function: Product Management, Level: Senior Vice President >
3. A list of preferred job locations extracted from the set of job preferences
Sterling, VA
Reston, VA
4. A total number of years of experience
6 years
5. Skills per previous employment
DNS, DHCP, SaaS
6. A list of <Education Level, Major> from the candidate profile
MS Management, School of Management....
<Education Level: Masters, Major: >
BS Computer Engineering, Indian Institute of Technology (IIT)...
<Education Level: Bachelors, Major: Computer Engineering>

Query Generation:
Product Management:
　Function Keywords: product, product management
　Level Keywords (levels and level synonyms from different titles): Asst Director, Executive Director, Vice President, Assistant Director, Associate Director, VP, Head, Vice-President, Director
　Industry Keywords (since 'consider Industry for Query' is set TRUE for this function): Telecommunication, Technical Services, SAAS, Software Service, IT Service, Telecommunications, Software Technology, Telecomm, Telecom, Cellular, Software Solutions, Telco, Information Technology, Wireless, Software Technologies, Information Technology Solutions, Software Services, IT Services.
　Query:
　(title:((Product OR "Product Management") AND ( "Asst Director" OR "Executive Director" OR "Vice President" OR "Assistant Director" OR "Associate Director" OR "VP" OR "Head" OR "Vice-President" OR "Director")) AND (Telecommunication OR "Technical Services" OR "SAAS" OR "Software Service" OR "IT Service" OR Telecommunications OR "Software Technology" OR Telecomm OR Telecom OR Cellular OR "Software Solutions" OR Telco OR "Information Technology" OR Wireless OR "Software Technologies" OR "Information Technology Solutions" OR "Software Services" OR "IT Services"))

Product Strategy:
　Function Keywords: product strategy, product strategies
　Level Keywords (levels and level synonyms from different titles): Asst Director, Executive Director, Vice President, Assistant Director, Associate Director, VP, Head, Vice-President, Director
　Industry Keywords (since 'consider Industry for Query' is set TRUE for this function): Telecommunication, Technical Services, SAAS, Software Service, IT Service, Telecommunications, Software Technology, Telecomm, Telecom, Cellular, Software Solutions, Telco, Information Technology, Wireless, Software Technologies, Information Technology Solutions, Software Services, IT Services.
　Query:
　(title:(( "product strategy" OR " product strategies ") AND ( "Asst Director" OR "Executive Director" OR "Vice President" OR "Assistant Director" OR "Associate Director" OR "VP" OR "Head" OR "Vice-President" OR "Director")) AND (Telecommunication OR "Technical Services" OR "SAAS" OR "Software Service" OR "IT Service" OR Telecommunications OR "Software Technology" OR Telecomm OR Telecom OR Cellular OR "Software Solutions" OR Telco OR "Information Technology" OR Wireless OR "Software Technologies" OR "Information Technology Solutions" OR "Software Services" OR "IT Services"))

Marketing:
　Function Keywords: marketing
　Level Keywords (levels and level synonyms from different titles): Sr Vice-President, Vice President, Sr Vice President, VP, Senior Vice President, Sr. VP, Sr. Vice President, SVP, Senior Vice-President, Sr VP, Sr. Vice-President, Vice-President
　Industry Keywords (since 'consider Industry for Query' is set TRUE for this function): Telecommunication, Technical Services, SAAS, Software Service, IT Service, Telecommunications, Software Technology, Telecomm, Telecom, Cellular, Software Solutions, Telco, Information Technology, Wireless, Software Technologies, Information Technology Solutions, Software Services, IT Services.

Query:
　(title:((Marketing) AND ( "Sr Vice-President" OR "Vice President" OR "Sr Vice President" OR "VP" OR "Senior Vice President" OR "Sr. VP" OR "Sr. Vice President" OR "SVP" OR "Senior Vice-President" OR "Sr VP" OR "Sr. Vice-President" OR "Vice-President")) AND (Marketing) AND (Telecommunication OR "Technical Services" OR "SAAS" OR "Software Service" OR "IT Service" OR Telecommunications OR "Software Technology" OR Telecomm OR Telecom OR Cellular OR "Software Solutions" OR Telco OR "Information Technology" OR Wireless OR "Software Technologies" OR "Information Technology Solutions" OR "Software Services" OR "IT Services"))

The generic query is formed by combining the above 3 queries by an OR operator.

FIG. 10

ONTOLOGY DEVELOPMENT FOR PROFILE MATCHING

CROSS REFERENCE TO OTHER APPLICATIONS

This application claims priority to U.S. Provisional Patent Application No. 61/406,967 entitled ONTOLOGY DEVELOPMENT FOR PROFILE MATCHING filed Oct. 26, 2010 which is incorporated herein by reference for all purposes.

BACKGROUND OF THE INVENTION

Matching a job seeker with a list of relevant job openings that the job seeker may be interested in pursuing is challenging for a number of reasons. One key challenge is that resumes and job profiles can be presented by different people in very different formats and styles. The terminology used in resumes and job profiles to describe a particular feature or characteristic can also be very different. The above challenges are further compounded by the volume of potential job profiles available for matching with the job seeker. As a result, poorly matched results may be obtained.

BRIEF DESCRIPTION OF THE DRAWINGS

Various embodiments of the invention are disclosed in the following detailed description and the accompanying drawings.

FIG. 2A illustrates a job seeker seeking a Chief Information Officer (CIO) position in the New York area.

FIG. 2B illustrates a job profile that matches poorly with the job seeker illustrated in FIG. 2A.

FIG. 4 is a diagram illustrating an embodiment of an interface 400 provided by job matching system 300 for a job seeker to enter his job-related preferences.

FIG. 6A is a diagram illustrating an embodiment of a job function record 602 for storing the specific job function "Regional Sales."

FIG. 6B is a diagram illustrating an embodiment of a job function record 604 for storing the job function "Product Management."

FIG. 6C is a diagram illustrating an embodiment of a job function record 606 for storing the job function "Product Strategy."

FIG. 6D is a diagram illustrating an embodiment of a job function record 608 for storing the job function "Marketing."

FIG. 7A is a diagram illustrating an exemplary candidate profile 702.

FIG. 7B is a diagram illustrating an exemplary set of preferences 704 selected by the candidate whose candidate profile is as shown in FIG. 7A.

FIG. 7C is a diagram illustrating an exemplary normalized candidate profile 706 that is generated based on the candidate profile 702 in FIG. 7A and the set of preferences 704 in FIG. 7B.

FIG. 10 is a diagram illustrating an exemplary generic search query generated by search module 306 based on normalized candidate profile 706 (see FIG. 7C) and ontology 302.

DETAILED DESCRIPTION

Figure 1:
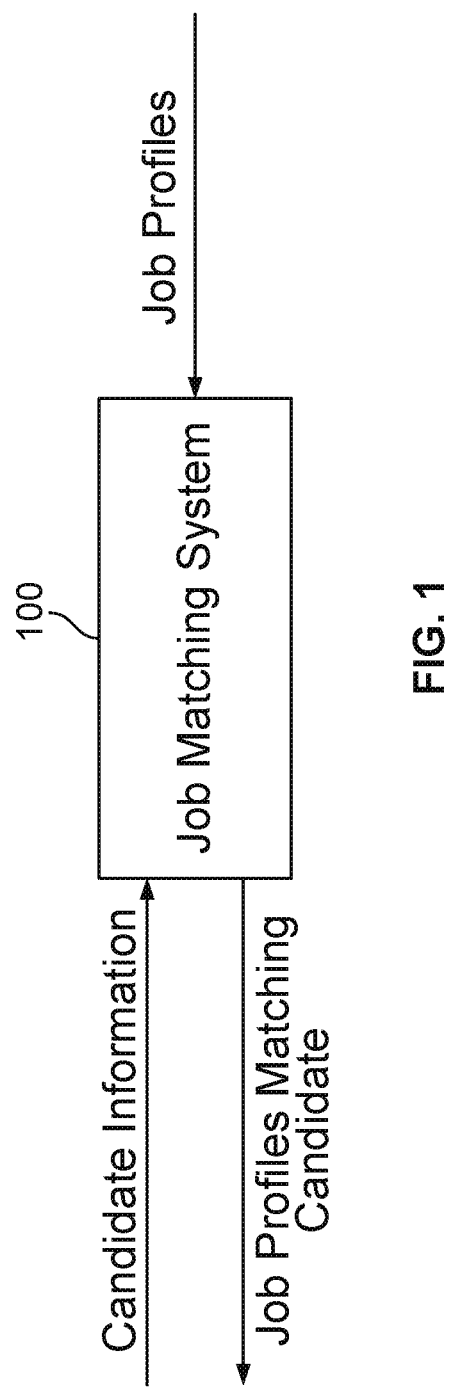
FIG. 1 is a block diagram illustrating an embodiment of a job matching system 100 for matching job profiles with a candidate profile.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Matching of job profiles with a candidate profile is disclosed. In various embodiments, a plurality of concepts corresponding to an ontology is extracted from a candidate profile. In various embodiments, a normalized candidate profile is generated, wherein the normalized candidate profile includes the plurality of concepts. In various embodiments, a search query is formed at least in part based on the normalized candidate profile and the ontology. In various embodiments, the search query is submitted to a source of job profiles. In various embodiments, an initial batch of job profiles potentially matching the candidate profile is received from the source of job profiles. In various embodiments, the plurality of concepts corresponding to the ontology is extracted from a job profile among the initial batch of job profiles. In various embodiments, a normalized job profile is generated, wherein the normalized job profile includes the plurality of concepts. In various embodiments, whether the normalized candidate profile matches with the normalized job profile is determined.

FIG. 1 is a block diagram illustrating an embodiment of a job matching system 100 for matching job profiles with a candidate profile. As shown in FIG. 1, the information of a candidate and a list of job profiles are fed as input into job matching system 100. For example, the information of a candidate, e.g., his or her resume, may be provided by the job seeker, and the list of job profiles may be provided by entities that have current job openings. Job matching system 100 processes the inputted information and outputs a list of matching job profiles. For example, job matching system 100 may rank each inputted job profile based on how well the job profile matches with the candidate and output a list of matched job profiles with the highest rankings.

Matching a job seeker with a list of relevant job openings that the job seeker may be interested in pursuing is challenging for a number of reasons. One key challenge is that resumes and job profiles can be presented by different people in very different formats and styles. The terminology used in resumes and job profiles to describe a particular feature or characteristic can also be very different.

FIGS. 2A and 2B illustrate an example in which a candidate's information and a job profile may be incorrectly matched together due to their differences in format or style. In particular, FIG. 2A illustrates a job seeker searching for a Chief Information Officer (CIO) position in the New York area. FIG. 2B depicts a job profile that matches poorly with the job seeker in FIG. 2A. As shown in FIG. 2B, the job profile corresponds to a job opening for a Chief IT Auditor reporting to a CIO, as opposed to a CIO. This mismatch occurs if the job matching system merely looks for matching keywords (e.g., CIO) without considering the job title's true meaning.

The above challenges are further compounded by the volume of potential job profiles available for matching with the job seeker. As a result, poorly matched results with a high false positive rate, a high false negative rate, or both, may be obtained.

Figure 3:
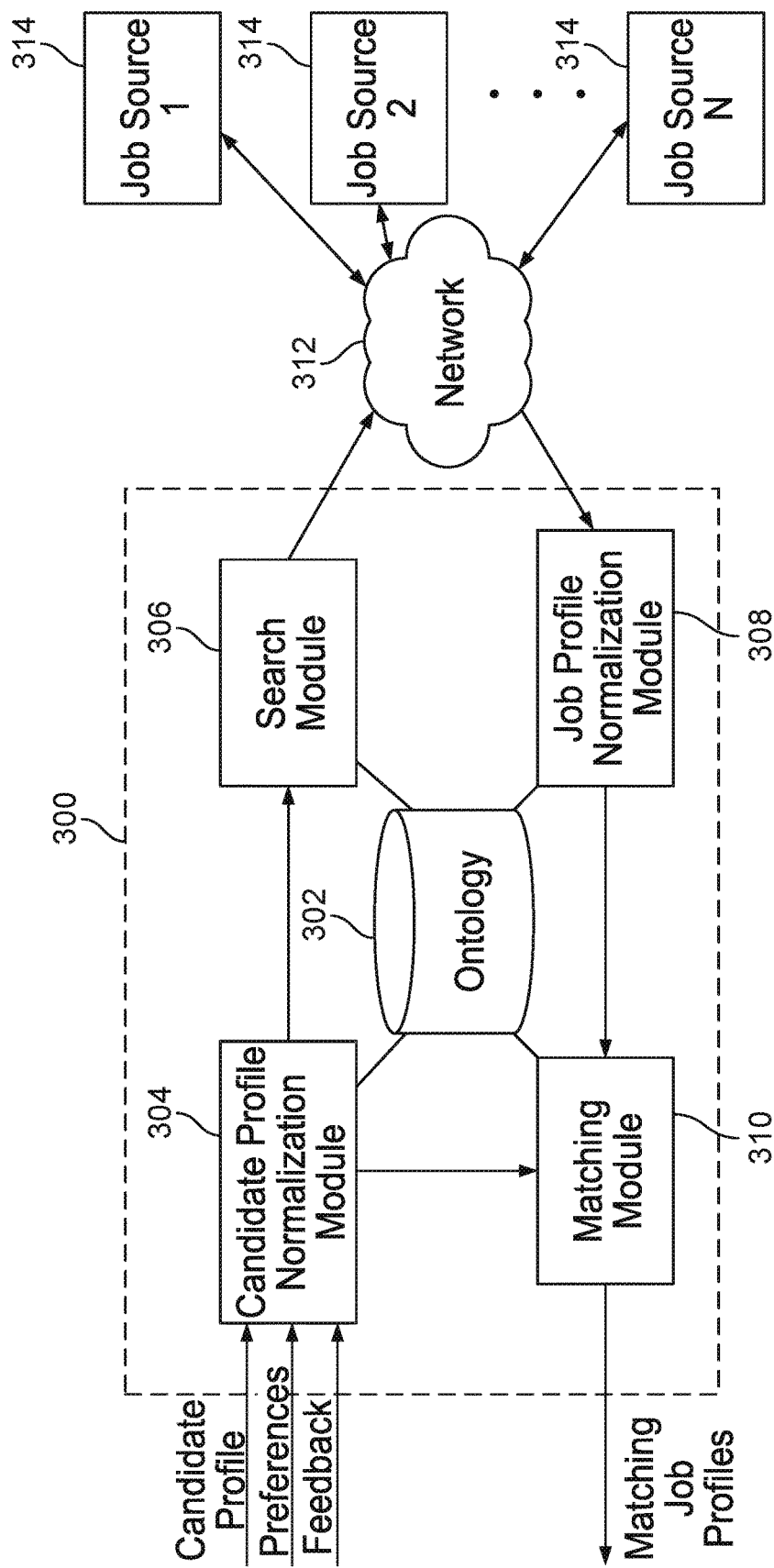
FIG. 3 is a block diagram illustrating an embodiment of a job matching system 300 for matching job profiles with a candidate profile.

FIG. 3 is a block diagram illustrating an embodiment of a job matching system 300 for matching job profiles with a candidate profile. As shown in FIG. 3, job matching system 300 receives as input different types of information from a job seeker or someone representing a job seeker. In some embodiments, the different types of input from a job seeker include a candidate profile, preferences of the job seeker, and feedback provided by the job seeker.

In some embodiments, a candidate profile is the resume of the job seeker. For example, the resume may be a text file, a Portable Document Format file (PDF), a file prepared using any commercially available word processors or editors, and the like.

FIG. 4 is a diagram illustrating an embodiment of an interface 400 provided by job matching system 300 for a job seeker to enter his job-related preferences. As shown in FIG. 4, the job seeker may enter desired job titles, such as Vice President Global Talent, Vice President Administration, and Vice President Travel Service. The job seeker may also select desired professional areas, including accounting, administration, banking, biotech, and the like. The job seeker may choose to limit (or not limit) his job search to specific industries, including advertising, advertising agency, and the like. The job seeker may specify the level of the job openings, such as Executive, Director, Manager, and Regular Staff. The job seeker may also enter preferred hours and locations of the job openings. Note that interface 400 in FIG. 4 is provided as an illustrative example only; accordingly, the present application is not limited to this specific example only.

With continued reference to FIG. 3, job matching system 300 includes an ontology 302 and a plurality of ontology-based modules, including a candidate profile normalization module 304, a search module 306, a job profile normalization module 308, and a matching module 310, as will be each described in greater detail below.

An ontology represents knowledge as a set of concepts within a domain and the relationships between those concepts. In particular, ontology 302 in FIG. 3 can be used to organize information in a domain, such as a Human Resource (HR) domain or recruiting domain. For example, ontology 302 specifies how different entities within an HR domain are grouped, related in hierarchies, or subdivided according to their similarities and differences. Ontology 302 includes hierarchies corresponding to a plurality of key concepts useful for job matching, including job function, job level, industry sector, skills, experience, education, and job type, and these hierarchies can be used to determine the semantic similarity between these key concepts.

In some embodiments, in addition to organizing different entities at the concept level (e.g., job function), ontology 302 organizes different entities around a combination of concepts. In some embodiments, ontology 302 is human-built and can be continuously enriched and enhanced by humans through editorial processes or via machine learning based on human feedback.

Figure 5:
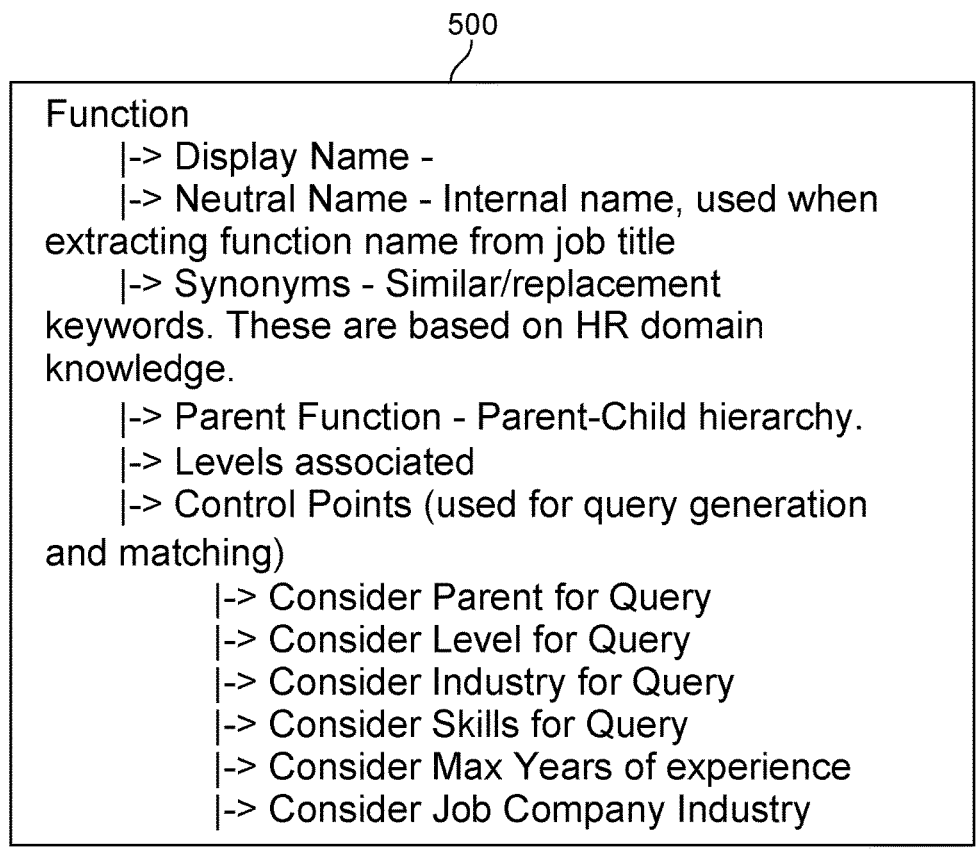
FIG. 5 is a diagram illustrating an embodiment of an ontology-based job function record 500 for storing an entry of one of the key concepts, job function.

FIG. 5 is a diagram illustrating an embodiment of an ontology-based job function record 500 for storing one entry of one of the key concepts, job function. Ontology 302 maintains thousands or more of these hierarchal and ontology-based records, each representing a specific type of job function. FIG. 6A is a diagram illustrating an embodiment of a job function record 602 for storing the specific job function "Regional Sales." FIG. 6B is a diagram illustrating an embodiment of a job function record 604 for storing the job function "Product Management." FIG. 6C is a diagram illustrating an embodiment of a job function record 606 for storing the job function "Product Strategy." FIG. 6D is a diagram illustrating an embodiment of a job function record 608 for storing the job function "Marketing."

With continued reference to FIG. 5, job function record 500 includes different fields. The Display Name field stores a name for the job function. The Neutral Name field stores an internal name for extracting a function name from a job title. The Synonyms field stores a list of synonyms for the job function. These synonyms are determined based on HR domain knowledge, and can be used as keywords for forming search queries. The Parent Function field is a pointer to a job function record that is the parent of the current record. For example, job function record 602 is a record for the job function "Regional Sales," and its parent function is "Sales." Some job function records do not have a parent job function record; accordingly, the Parent Function fields for those job function records (e.g., job function records 604, 606, and 608) are set to NULL. The Control Points field, as will be described in greater detail below, stores a plurality of "True" or "False" options for query generation and matching.

Ontology 302 maintains other hierarchal and ontology-based records to represent other key concepts, including job level, industry sector, skills, experiences, education, and job type. In some embodiments, these other hierarchal and ontology-based records may have fields similar to those shown in job function record 500 for storing a job function (see FIG. 5). In other embodiments, the fields of the records for key concepts other than job function may be different from those shown in job function record 500 in order to include information specific to the particular type of key concept.

With continued reference to FIG. 3, candidate profile normalization module 304 of job matching system 300 is an ontology-based module that receives as input different types of information from a job seeker or someone representing a job seeker. In some embodiments, the different types of input from a job seeker include a candidate profile, a set of preferences of the job seeker, and feedback provided by the job seeker. The candidate profile and the set of job preferences together include information regarding the job seeker's past career paths and future job preferences. However, this information may be presented in different styles and formats by different job seekers. Accordingly, candidate profile normalization module 304 converts the information provided by the job seeker into a normalized candidate profile, which can be further interpreted and analyzed by the other ontology-based modules in job matching system 300.

Candidate profile normalization module 304 provides a normalized candidate profile based on a plurality of key concepts (e.g., job function, job level, industry sector, skills, experiences, education, and job type) extracted from the candidate profile and the set of preferences. For example, an exemplary normalized candidate profile may include the following:

1. Extracted from each previous employment listed in the candidate profile: a list of past job functions and their corresponding levels and industries (extracted concepts include job function, level, and industry);
2. Extracted from the set of preferences: a list of preferred future job functions and their corresponding levels (extracted concepts include job function and level);
3. Extracted from the set of preferences: a list of preferred job locations;
4. Extracted from the candidate profile: the total number of years of work experience;
5. Extracted from each previous employment listed in the candidate profile: a list of skills (the extracted concept includes skills);
6. Extracted from the education section of the candidate profile: a list of education levels and their corresponding majors (the extracted concept includes education).

In the above example, neither preferred job locations (item 3) nor the total number of years of work experience (item 4) are among the key concepts represented by ontology 302. Accordingly, items 3 and 4 may be extracted directly as text strings from the set of preferences and the candidate profile, respectively. Conversely, items 1, 2, 5, and 6 each includes one or more key concepts represented by ontology 302. Accordingly, these items are extracted based on ontology 302, as will be described in greater detail below.

FIG. 7A is a diagram illustrating an exemplary candidate profile 702. FIG. 7B is a diagram illustrating an exemplary set of preferences 704 selected by the candidate whose candidate profile is as shown in FIG. 7A. FIG. 7C is a diagram illustrating an exemplary normalized candidate profile 706 that is generated based on the candidate profile 702 in FIG. 7A and the set of preferences 704 in FIG. 7B. FIGS. 7A, 7B, and 7C are provided as an example for illustrating how key concepts are extracted from a candidate profile and a set of preferences, and how the key concepts are used to generate a normalized candidate profile.

With reference to FIGS. 7A and 7C, key concepts are extracted from candidate profile 702 and then included in normalized candidate profile 706. For example, as shown in FIG. 7A, candidate profile 702 lists two previous job positions. In the first previous job position, the job title is "Senior Director Product Management." In the second previous job position, the job title is "Director of Product Strategy." Three key concepts (job function, level, and industry) are extracted from each of the job positions. In particular, as shown in item 1(*a*) of normalized candidate profile 706 (see FIG. 7C), the extracted job function for the first previous job position is "Product Management," and the extracted level and the extracted industry are "Senior Director" and "Information Technology and Services," respectively. Similarly, as shown in item 1(*b*) of normalized candidate profile 706, the extracted job function for the second previous job position is "Product Strategy," and the extracted level and extracted industry are "Director" and "Telecommunications," respectively.

Figure 8:
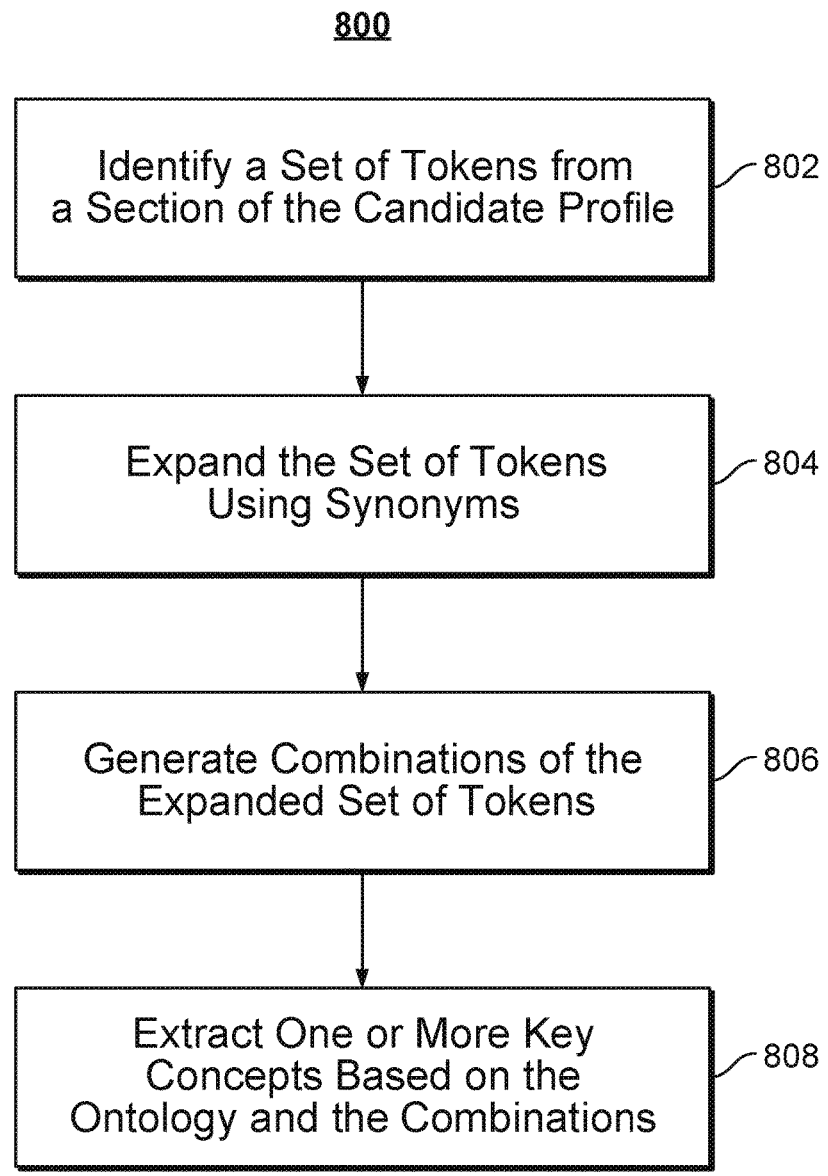
FIG. 8 is a diagram illustrating an embodiment of a process 800 for extracting one or more key concepts from a section of candidate profile 702 based on ontology 302.

Key concepts are extracted from candidate profile 702 based on ontology 302. FIG. 8 is a diagram illustrating an embodiment of a process 800 for extracting one or more key concepts from a section of candidate profile 702 based on ontology 302. In some embodiments, only a subset of the key concepts is extracted from a particular section of candidate profile 702. For example, candidate profile 702 is divided into sections based on the subject matter of the sections, which may include job titles, companies, employment descriptions, education, and the like. Based on HR domain knowledge, only a subset of the key concepts is extracted from each section. For example, job titles are used to extract two key concepts, job function and level. Companies are used to extract the key concept industry. Employment descriptions are used to extract skills. By dividing candidate profile 702 into sections and extracting only certain key concepts from a particular section, the extraction of the key concepts becomes more robust and is less prone to errors.

With continued reference to FIG. 8, at 802, a set of tokens are identified from a section of candidate profile 702. For example, a set of tokens are identified from the job title "Senior Director Product Management" listed in candidate profile 702. The tokens include "director," "management," "product," and "senior."

At 804, the set of identified tokens are expanded using synonyms. At 806, different combinations of the expanded set of tokens are generated. For example, the combinations of the four tokens above include: product-senior, management-product, director-management-product, director-product-senior, director, director-management-product-senior, product, director-senior, director-management, management-product-senior, director-management-senior, management-senior, management, senior, and director-product.

At 808, one or more key concepts are extracted based on ontology 302 and the different combinations of the expanded set of tokens. One of the key concepts extracted from a job title is job function. As described above, ontology 302 maintains different job function records 500 (see FIG. 5), each representing a specific type of job function. In some embodiments, the combinations are matched against the different job function records 500 and the best-matched job function record is selected. In some embodiments, a particular combination that has the longest match with a name of a particular job function record 500 may be selected. For example, the combination "management-product" has the longest match with the job function record with the name "Product Management." Thus, the extracted job function is "Product Management," as indicated in item 1(*a*) of normalized candidate profile 706 in FIG. 7C. Another key concept that can be extracted from a job title is the corresponding level. The level can be extracted in a similar way as a job function as described above. For example, the combination "director-senior" has the longest match with an ontology-based record storing the level "Senior Director." Thus, the extracted level is "Senior Director," as indicated in item 1(a) of normalized candidate profile 706 in FIG. 7C.

With reference to FIGS. 7B and 7C, key concepts are extracted from the set of preferences 704 and then included in normalized candidate profile 706. For example, as shown in FIG. 7B, the set of preferences 704 lists four preferred future job functions: VP Marketing, VP Product Strategy, VP Product Management, and Senior Vice President Product Management. Two key concepts (job function and level) are extracted from each preferred future job function. In particular, as shown in item 2 of normalized candidate profile 706 (see FIG. 7C), the extracted job functions and levels are <Marketing, VP>, <Product Strategy, VP>, <Product Management, VP>, and <Product Management, Senior Vice President>.

Figure 9:
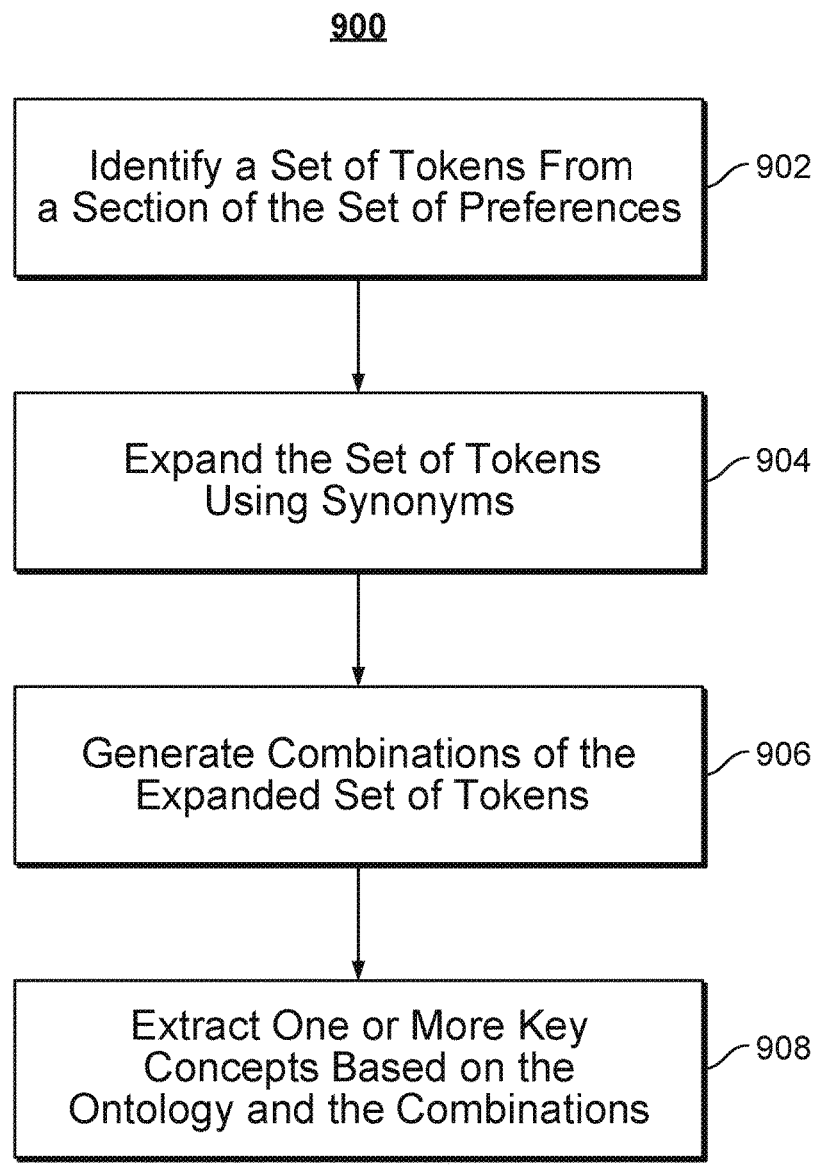
FIG. 9 is a diagram illustrating an embodiment of a process 900 for extracting one or more key concepts from a section of the set of preferences 704 based on ontology 302.

Key concepts are extracted from the set of preferences 704 based on ontology 302. FIG. 9 is a diagram illustrating an embodiment of a process 900 for extracting one or more key concepts from a section of the set of preferences 704 based on ontology 302. In some embodiments, only a subset of the key concepts is extracted from a particular section of the set of preferences 704. For example, as shown in FIG. 7B, the set of preferences 704 is divided into sections based on the subject matter of the sections. The subject matter of the sections includes the title, industry, locations, and the like. Based on HR domain knowledge, only a subset of the key concepts is extracted from each section. For example, job titles are used to extract two key concepts, job function and level. By dividing the set of preferences 704 into sections and extracting only certain key concepts from a particular section, the extraction of the key concepts becomes more robust and is less prone to errors.

With reference to FIG. 9, process 900 is similar to process 800. At 902, a set of tokens are identified from a section of the set of preferences 704. At 904, the set of identified tokens are expanded using synonyms. At 906, different combinations of the expanded set of tokens are generated. At 908, one or more key concepts are extracted based on ontology 302 and the different combinations of the expanded set of tokens.

With continued reference to FIG. 3, candidate profile normalization module 304 sends normalized candidate profile 706 to a search module 306. Search module 306 generates a generic search query based on normalized candidate profile 706 and ontology 302. For example, the extracted key concepts included in normalized candidate profile 706 are each expanded using synonyms (e.g., see the synonyms field in job function record 500) provided by ontology 302. The expanded key concepts are then used to form a generic search query. In some embodiments, an extracted key concept listed in normalized candidate profile 706 may be expanded by including the keywords of its parent as synonyms of the extracted key concept. For example, if the field "Consider Parent for Query" in job function record 500 is set to TRUE, then keywords for the parent are included in the generic search query as well.

In some embodiments, a generic search query has the following format:
(Any of the keywords for the job function) AND (Any of the keywords for level) AND (Any of the keywords for skills) AND (Any of the keywords for industry) AND (boost keywords) NOT (Any of the 'Should not occur' keywords)

FIG. 10 is a diagram illustrating an exemplary generic search query generated by search module 306 based on normalized candidate profile 706 (see FIG. 7C) and ontology 302.

With continued reference to FIG. 3, the generic search query generated by search module 306 is further converted to a specific search query by a job source driver corresponding to a particular job source. The specific search query is then sent to the particular job source 314 via a network 312. In some embodiments, search queries are sent to a plurality of job sources 314. The job sources 314 include job search websites, such as Indeed, Simplyhired, and Juju. The job sources 314 may also include a local job repository. In response to the search queries, the various job sources 314 send a first batch of job profiles matching the search queries to a job profile normalization module 308.

The job profiles sent by job sources 314 may be presented in different styles and formats. Accordingly, job profile normalization module 308 converts each job profile into a normalized job profile, which can be further interpreted, analyzed, and matched by job matching system 300.

A normalized job profile includes different information, including job title, hiring company, industry, job location, job description, industry, job posted date, job function, job level, number of years of experience requirement, required education, required skills, salary range offered by the job, job type, and the like. Some of the information in the normalized job profile are key concepts (e.g., job function, job level, industry, skills, experiences, education, and job type) extracted from the original job profile. These key concepts can be extracted from the original job profile in a similar manner as key concepts are extracted from a candidate profile, as described above.

With continued reference to FIG. 3, job profile normalization module 308 sends the normalized job profiles to a matching module 310. In some embodiments, matching module 310 is a rule-based concept proximity system that uses a set of rules to match the normalized first batch of job profiles against the normalized candidate profile to yield a second final batch of job profiles that can be provided to the job seeker.

Matching module 310 uses different sets of rules to filter out job profiles that do not match with the candidate profile or the set of preferences. In some embodiments, matching module 310 checks whether the job type specified by a job profile matches with the candidate profile or the set of preferences. The job types include full-time, contract, part-time, telecommute, project-basis, and the like. If they do not match, then the job profile is filtered out.

In some embodiments, matching module 310 checks whether the job profile has expired. For example, after a hiring company finds a suitable candidate for a job opening, the job profile is marked as expired. If matching module 310 determines that a job profile has already expired, then the job profile is filtered out.

In some embodiments, matching module 310 matches job profiles with a candidate profile based on their job functions. In some embodiments, the following rules are applied:
1. If the extracted job function in a normalized job profile matches with one of the extracted job functions listed in the normalized candidate profile, then the job profile is marked as a match.
2. If, for the extracted job function in the normalized job profile, the parent function can be considered a match (by checking whether the "Consider Parent For Query" field in job function record 500 is TRUE), then if the parent function matches with one of the extracted job functions listed in the normalized candidate profile, the job profile is marked as a match.

3. If after applying the above two rules the job profile has not been marked as a match, then the job profile is marked as a mismatch and is filtered out.

In some embodiments, matching module 310 matches job profiles with a candidate profile based on additional matching criteria, including industry, education, experience, location, number of years of experience, skills, salary range, and the like.

Job matching system 300 initially obtains a first batch of job profiles that may potentially be matched with the job seeker. Then job matching system 300 filters the first batch of job profiles by matching the normalized candidate profile against the normalized job profiles. This two-step process has a number of advantages. For example, the step of obtaining a first batch of job profiles reduces the false-negative rate of the overall match results, while the step of filtering the first batch of job profiles again reduces the false-positive rate of the overall match results.

Figure 11:
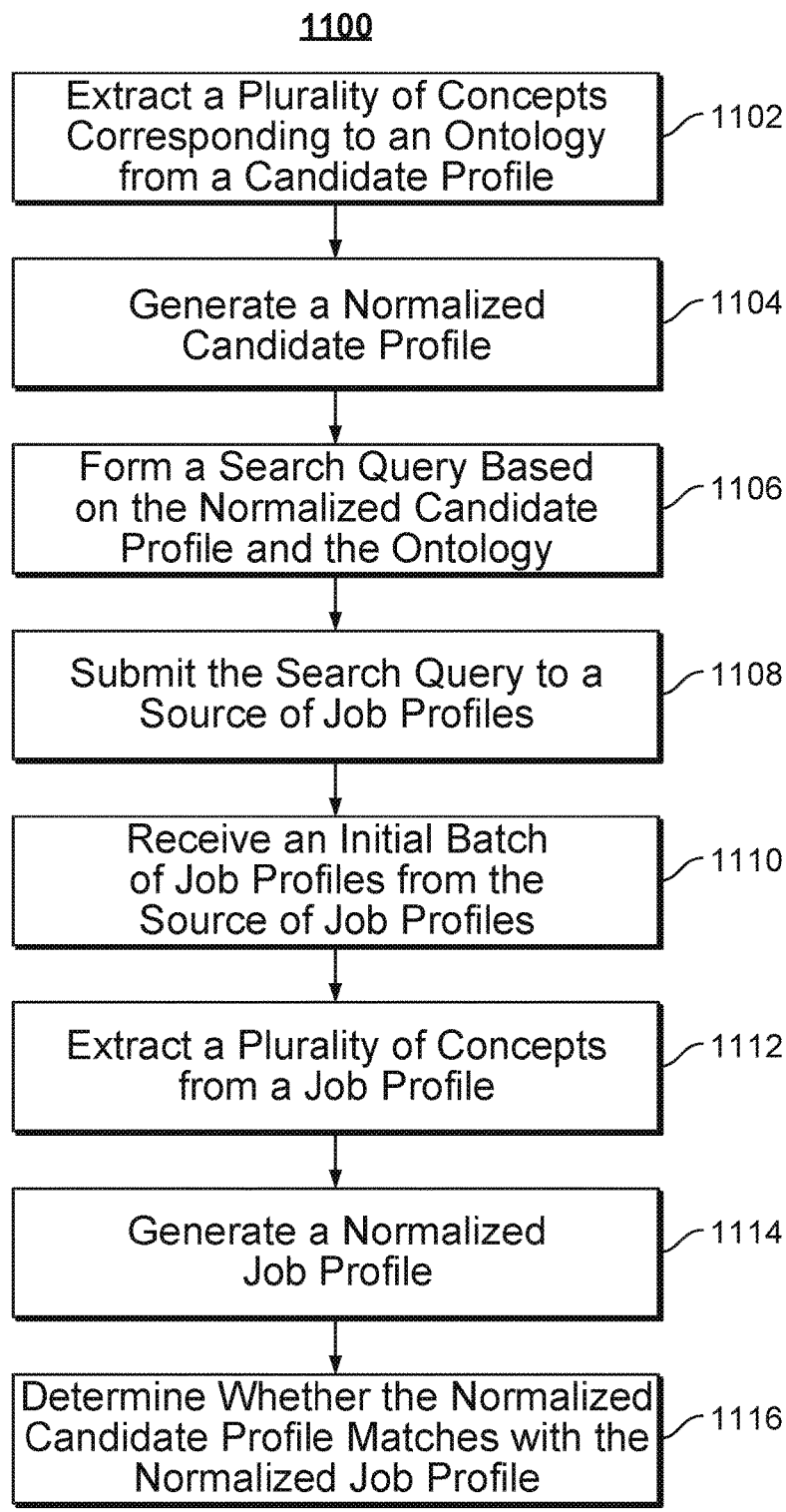
FIG. 11 is a diagram illustrating an embodiment of a process 1100 for matching job profiles with a candidate profile.

FIG. 11 is a diagram illustrating an embodiment of a process 1100 for matching job profiles with a candidate profile. In some embodiments, process 100 is a process for job matching system 300. At 1102, a plurality of concepts corresponding to an ontology is extracted from a candidate profile. The concepts include job function, job level, industry sector, skills, experience, education, and job type. In some embodiments, process 800 is a process for step 1102. At 1104, a normalized candidate profile is generated, wherein the normalized candidate profile includes the plurality of concepts. At 1106, a search query is formed at least in part based on the normalized candidate profile and the ontology. At 1108, the search query is submitted to a source of job profiles. At 1110, an initial batch of job profiles potentially matching the candidate profile is received from the source of job profiles. At 1112, the plurality of concepts corresponding to the ontology is extracted from a job profile among the initial batch of job profiles. At 1114, a normalized job profile is generated, wherein the normalized job profile includes the plurality of concepts. At 1116, whether the normalized candidate profile matches with the normalized job profile is determined.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of matching job profiles with a candidate profile, comprising:
    extracting from a candidate profile by a processor a plurality of concepts corresponding to an ontology, wherein an ontology represents knowledge as a set of concepts within a domain and represents relationships between the concepts, wherein extracting the concepts corresponding to the ontology comprises:
        partitioning the candidate profile into a plurality of sections at least in part based on a subject matter of each section;
        determining, for each section, a portion of the plurality of concepts to be extracted from the section and a remaining portion of the plurality of concepts not to be extracted from the section; and
        extracting from each section the corresponding determined portion of the plurality of concepts;
    generating by the processor a normalized candidate profile that is normalized based on the ontology, wherein the normalized candidate profile includes the plurality of extracted concepts that have been extracted from the candidate profile;
    matching the normalized candidate profile that is normalized based on the ontology against a plurality of job profiles that have not been normalized based on the ontology, wherein a job profile comprises information corresponding to a job offer, and wherein the plurality of job profiles are stored in a plurality of job profile sources, including public or commercial job databases and websites;
    obtaining an initial batch of job profiles that have not been normalized based on the ontology and that match with the normalized candidate profile; and
    reducing the initial batch of job profiles that have not been normalized based on the ontology and that match with the normalized candidate profile to a final batch of job profiles, comprising:
        for each job profile among the initial batch of job profiles:
            extracting from each job profile among the initial batch of job profiles at least a subset of the plurality of concepts corresponding to the ontology;
            generating a normalized job profile that is based on the ontology, wherein the normalized job profile includes the at least a subset of the plurality of extracted concepts that have been extracted from the job profile; and
            determining whether the normalized candidate profile that is normalized based on the ontology matches with the normalized job profile that is normalized based on the ontology, and in the event that the normalized candidate profile matches with the normalized job profile, including the job profile in the final batch of job profiles.

2. The method of claim 1, wherein the subject matter of each section comprises one of the following: job title, company, employment descriptions, or education.

3. The method of claim 1, further comprising:
    extracting from a set of candidate preferences one or more of the plurality of concepts corresponding to the ontology.

4. The method of claim 3, further comprising:
    partitioning the set of candidate preferences into a plurality of sections at least in part based on a subject matter of each section;
    determining, for each section, a portion of the one or more of the plurality of concepts to be extracted from the section; and
    wherein extracting from the set of candidate preferences comprises extracting the determined portion of the one or more of the plurality of concepts from each section.

5. The method of claim 4, wherein the subject matter of each section comprises one of the following: job title, industry, or locations.

6. The method of claim 1, wherein the plurality of concepts comprises one or more of the following: job function, job level, industry, skills, experience, education, and job type.

7. The method of claim 1, further comprising:
    receiving human feedback in response to the determination of whether the normalized candidate profile matches with the normalized job profile; and enhancing the ontology at least in part based on the received human feedback.

8. The method of claim 1, wherein the ontology includes a plurality of hierarchal structures, wherein each hierarchal structure includes records for storing one of the plurality of concepts.

9. The method of claim 1, wherein matching the normalized candidate profile that is normalized based on the ontology against a plurality of job profiles that have not been normalized comprises:
forming a search query at least in part based on the normalized candidate profile and the ontology, comprising:
forming the search query at least in part based on the plurality of extracted concepts; and
forming the search query at least in part based on synonyms of the plurality of concepts provided by the ontology; and
submitting the search query to the plurality of job profile sources.

10. The method of claim 1, wherein the determining of whether the normalized candidate profile matches with the normalized job profile is at least in part based on a set of matching rules.

11. A system for matching job profiles with a candidate profile, comprising:
a processor configured to:
extract from a candidate profile a plurality of concepts corresponding to an ontology, wherein an ontology represents knowledge as a set of concepts within a domain and represents relationships between the concepts, wherein extracting the concepts corresponding to the ontology comprises:
partitioning the candidate profile into a plurality of sections at least in part based on a subject matter of each section;
determining, for each section, a portion of the plurality of concepts to be extracted from the section and a remaining portion of the plurality of concepts not to be extracted from the section; and
extracting from each section the corresponding determined portion of the plurality of concepts;
generate a normalized candidate profile that is normalized based on the ontology, wherein the normalized candidate profile includes the plurality of extracted concepts that have been extracted from the candidate profile;
match the normalized candidate profile that is normalized based on the ontology against a plurality of job profiles that have not been normalized based on the ontology, wherein a job profile comprises information corresponding to a job offer, and wherein the plurality of job profiles are stored in a plurality of job profile sources, including public or commercial job databases and websites;
obtain an initial batch of job profiles that have not been normalized based on the ontology and that match with the normalized candidate profile; and
reduce the initial batch of job profiles that have not been normalized based on the ontology and that match with the normalized candidate profile to a final batch of job profiles, comprising:
for each job profile among the initial batch of job profiles:
extract from each job profile among the initial batch of job profiles at least a subset of the plurality of concepts corresponding to the ontology;
generate a normalized job profile that is based on the ontology, wherein the normalized job profile includes the at least a subset of the plurality of extracted concepts that have been extracted from the job profile; and
determine whether the normalized candidate profile that is normalized based on the ontology matches with the normalized job profile that is normalized based on the ontology, and in the event that the normalized candidate profile matches with the normalized job profile, include the job profile in the final batch of job profiles; and
a memory coupled to the processor and configured to provide the processor with instructions.

12. The system of claim 11, wherein the subject matter of each section comprises one of the following: job title, company, employment descriptions, or education.

13. The system of claim 11, wherein the processor is further configured to:
extract from a set of candidate preferences one or more of the plurality of concepts corresponding to the ontology.

14. The system of claim 13, wherein the processor is further configured to:
partition the set of candidate preferences into a plurality of sections at least in part based on a subject matter of each section;
determine, for each section, a portion of the one or more of the plurality of concepts to be extracted from the section; and
wherein extracting from the set of candidate preferences comprises extracting the determined portion of the one or more of the plurality of concepts from each section.

15. The system of claim 14, wherein the subject matter of each section comprises one of the following: job title, industry, or locations.

16. The system of claim 11, wherein the plurality of concepts comprises one or more of the following: job function, job level, industry, skills, experience, education, and job type.

17. The system of claim 11, wherein the processor is further configured to:
receive human feedback in response to the determination of whether the normalized candidate profile matches with the normalized job profile; and
enhance the ontology at least in part based on the received human feedback.

18. The system of claim 11, wherein the ontology includes a plurality of hierarchal structures, wherein each hierarchal structure includes records for storing one of the plurality of concepts.

19. The system of claim 11,
wherein matching the normalized candidate profile that is normalized based on the ontology against a plurality of job profiles that have not been normalized comprises:
forming a search query at least in part based on the normalized candidate profile and the ontology, comprising:
forming the search query at least in part based on the plurality of extracted concepts; and
forming the search query at least in part based on synonyms of the plurality of concepts provided by the ontology; and submitting the search query to the plurality of job profile sources.

20. The system of claim 11, wherein the determining of whether the normalized candidate profile matches with the normalized job profile is at least in part based on a set of matching rules.

21. A computer program product for matching job profiles with a candidate profile, the computer program product being embodied in a non-transitory computer readable storage medium and comprising computer instructions for:
    extracting from a candidate profile a plurality of concepts corresponding to an ontology, wherein an ontology represents knowledge as a set of concepts within a domain and represents relationships between the concepts, wherein extracting the concepts corresponding to the ontology comprises:
        partitioning the candidate profile into a plurality of sections at least in part based on a subject matter of each section;
        determining, for each section, a portion of the plurality of concepts to be extracted from the section and a remaining portion of the plurality of concepts not to be extracted from the section; and
        extracting from each section the corresponding determined portion of the plurality of concepts;
    generating a normalized candidate profile that is normalized based on the ontology, wherein the normalized candidate profile includes the plurality of extracted concepts that have been extracted from the candidate profile;
    matching the normalized candidate profile that is normalized based on the ontology against a plurality of job profiles that have not been normalized based on the ontology, wherein a job profile comprises information corresponding to a job offer, and wherein the plurality of job profiles are stored in a plurality of job profile sources, including public or commercial job databases and websites;
    obtaining an initial batch of job profiles that have not been normalized based on the ontology and that match with the normalized candidate profile; and
    reducing the initial batch of job profiles that have not been normalized based on the ontology and that match with the normalized candidate profile to a final batch of job profiles, comprising:
        for each job profile among the initial batch of job profiles:
            extracting from each job profile among the initial batch of job profiles at least a subset of the plurality of concepts corresponding to the ontology;
            generating a normalized job profile that is based on the ontology, wherein the normalized job profile includes the at least a subset of the plurality of extracted concepts that have been extracted from the job profile; and
            determining whether the normalized candidate profile that is normalized based on the ontology matches with the normalized job profile that is normalized based on the ontology, and in the event that the normalized candidate profile matches with the normalized job profile, including the job profile in the final batch of job profiles.

* * * * *